United States Patent
Harada et al.

(10) Patent No.: US 6,851,355 B2
(45) Date of Patent: Feb. 8, 2005

(54) PRESSING METHOD, PRESSING MECHANISM AND RESIN MOLDING DEVICE

(75) Inventors: Akiyuki Harada, Kyoto (JP); Masataka Takehara, Kyoto (JP)

(73) Assignee: Towa Corporation, Kyoto (JP)

( * ) Notice: Subject to any disclaimer, the term of this patent is extended or adjusted under 35 U.S.C. 154(b) by 526 days.

(21) Appl. No.: 09/929,694

(22) Filed: Aug. 13, 2001

(65) Prior Publication Data

US 2002/0023535 A1 Feb. 28, 2002

(30) Foreign Application Priority Data

Aug. 30, 2000 (JP) ........................................ 2000-260678

(51) Int. Cl.[7] ............................ B30B 13/00; F15B 7/00
(52) U.S. Cl. ................. 100/35; 100/269.01; 72/453.18; 60/545; 60/581
(58) Field of Search ............................... 100/35, 48, 99, 100/240, 269.01, 269.18, 269.07, 269.06, 270, 299; 72/453.02, 453.06, 453.08, 453.18; 60/545, 571, 534, 581; 310/311, 317, 316.01

(56) References Cited

U.S. PATENT DOCUMENTS 2,382,045 A * 8/1945 Flowers ........................ 72/377
5,095,725 A * 3/1992 Wada et al. .................. 72/31.13
5,161,865 A * 11/1992 Higashimata et al. ..... 303/115.2

FOREIGN PATENT DOCUMENTS

| JP | 60-177897 A | * | 9/1985 | ............ B30B/1/32 |
| JP | 08 078454 | | 3/1996 | |
| JP | 11-179600 A | * | 7/1999 | ............ B30B/1/32 |
| JP | 2000031178 | | 1/2000 | |

OTHER PUBLICATIONS

Translation copy of Japan utility patent No. 60–177897 A.*

* cited by examiner

Primary Examiner—Allen Ostrager
Assistant Examiner—Jimmy T Nguyen
(74) Attorney, Agent, or Firm—W. F. Fasse; W. G. Fasse

(57) ABSTRACT

The pressing method includes the first step of displacing a sub-piston provided within a sub-cylinder from its initial position to press working fluid such that the working fluid is introduced via a check valve into a main cylinder to displace a main piston provided therein, and the second step of causing the sub-piston to return to the initial position such that the working fluid is supplied to the sub-cylinder. The first and second steps are repeated successively until the working fluid in the main cylinder attains a prescribed pressure level. With this method, variation in the way of pressing an object is alleviated, contamination due to the working fluid is prevented, and downsizing of the pressing mechanism is enabled.

7 Claims, 6 Drawing Sheets

PRESSING METHOD, PRESSING MECHANISM AND RESIN MOLDING DEVICE

BACKGROUND OF THE INVENTION

1. Field of the Invention

The present invention relates to a pressing method, a pressing mechanism and a resin molding device that utilize pressure of working fluid.

2. Description of the Background Art

A pressing mechanism conventionally used in a resin sealing device, which introduces molten resin into a cavity to resin-seal an electronic component in a chip form in a substrate, or in other resin molding devices is of the type that has a base freely movable up and down. The base is provided with a cylindrical hole through which a piston is inserted via a spring, and the entire base is moved up and down by hydraulic pressure. In the case of the resin molding device, a plunger that is attached to an end of the piston is pushed up to press molten resin to make it enter the cavity, where the molten resin is hardened for resin molding.

The conventional pressing mechanism, however, poses the following problems. First, the hydraulic pressing mechanism requires piping for hydraulic oil. The oil may leak out of the piping, contaminating the surrounding area. Such contamination becomes a serious problem especially in the assembly process of electronic components like semiconductor devices.

In addition, to use a spring to transmit the movement of the base to the piston, the spring should have a large diameter to receive the pressure. This makes it difficult to downsize the pressing mechanism. Usually such a problem is fatal in the resin molding device employing a plurality of plungers, as it becomes difficult to downsize the device itself.

Further, variation in spring characteristics is likely to cause variation in the way of pushing up the piston by the pressing mechanism. In the resin molding device employing a plurality of plungers, such variation is usually accompanied by variation in fluidity of the molten resin, making it difficult to push up the pistons in a uniform manner. This may create void or surface sink in a molded article, thereby degrading the quality thereof.

SUMMARY OF THE INVENTION

An object of the present invention is to provide a pressing method, a pressing mechanism and a resin molding device employing the mechanism, which lessen variation in the way of pressing an object, prevent contamination due to working fluid, and permit downsizing of the pressing mechanism and the resin molding device.

According to one aspect, the pressing method of the present invention for accomplishing the object above is a method for pressing an object with a main piston placed in a main cylinder by means of applying a prescribed pressure to the main piston with working fluid, wherein the working fluid is compressed to the prescribed pressure by supplying the working fluid to the main cylinder with driving power of a piezoelectric element.

More specifically, a prescribed voltage is applied to the piezoelectric element repeatedly until the pressure of the working fluid reaches to the prescribed pressure.

According to the present method, the piezoelectric elements each having an accurate displacement are displaced for repeatedly supplying the working fluid to the main cylinder and pressing it to displace the main piston in a stepped manner. Accordingly, the variation in the way of pressing the object by the main piston can further be alleviated.

According to another aspect, the pressing method of the present invention relates to a method for pressing an object with a main piston, utilizing working fluid to which a prescribed pressure is applied through a piping system. The piping system includes a main cylinder, a supply line and a discharge line of the working fluid with respect to the main cylinder, a check valve preventing reverse flow of the working fluid from the main cylinder to the supply line, and a sub-cylinder provided in the supply line. The method includes: a first step of displacing a sub-piston provided within the sub-cylinder from its initial position to press the working fluid, and introducing the working fluid via the check valve into the main cylinder to displace the main piston provided within the main cylinder; and a second step of causing the sub-piston to return to the initial state to supply the working fluid to the sub cylinder. The first and second steps are repeated successively until the working fluid in the main cylinder attains a prescribed pressure level.

More specifically, the first step is performed in the state where a discharge control valve provided in the discharge line and a supply control valve provided in the supply line are closed. The second step is performed in the state where the discharge control valve and the check valve are closed and the supply control valve is open.

According to the pressing method, the main piston provided with the main cylinder is displaced in a stepped manner by repeating the step of supplying the working fluid to the sub-cylinder and the step of pressing the fluid. Accordingly, compared to the conventional pressing method in which the movement of the base is transmitted to the piston via the spring, the variation in the way of pressing the object by the main piston can be alleviated.

In the pressing method of the present invention, a piezoelectric element as driving means is preferably attached to each of the supply control valve, the discharge control valve and the sub-piston. These piezoelectric elements serve to open and close the supply control valve and the discharge control valve, and to displace the sub-piston from its initial position.

With such a step, the piezoelectric elements each having an accurate displacement are displaced for repeatedly supplying the working fluid to the sub-cylinder and pressing it to displace the main piston in a stepped manner. Accordingly, the variation in the way of pressing the object by the main piston can further be alleviated.

In a preferred embodiment of the pressing method of the present invention, in the pressing method described above, a detector provided in the main cylinder detects the pressure of the working fluid, and when the detector detects the prescribed pressure level, the displacement of the sub-piston is terminated.

With such a structure, it is possible to detect the pressure of the working fluid pressing the main piston and thus to detect the position of the main piston with accuracy. The main piston can be stopped when it reaches a prescribed position.

The pressing mechanism of the present invention for accomplishing the object above is a pressing mechanism that presses an object using pressure of working fluid supplied from a working fluid source to a piping system with a prescribed pressure. The pressing mechanism includes: a main piston for pressing the object; a main cylinder having the main piston placed therein and supplied with the working fluid for displacement of the main piston; a check valve preventing reverse flow of the working fluid supplied to the main cylinder; a sub-cylinder linked to the main cylinder and having the working fluid reserved therein for supply to the main cylinder; a sub-piston placed within the sub-cylinder; a supply line for supplying the working fluid from the working fluid source to the sub-cylinder; a supply control valve provided in the supply line; a discharge line for discharging the working fluid from the main cylinder to the working fluid source; a discharge control valve provided in the discharge line; a first driving mechanism for driving the sub-piston; a second driving mechanism for driving the supply control valve; and a third driving mechanism for driving the discharge control valve.

With this mechanism, the working fluid supplied to the sub-cylinder is pressed to push up the main piston, and the main piston presses the object.

Preferably, in the pressing mechanism of the present invention, the first, second and third driving mechanisms each include a piezoelectric element, and the piezoelectric elements drive the sub-piston, the supply control valve and the discharge control valve, respectively.

With such a mechanism, the piezoelectric elements each having an accurate displacement are used for repeatedly supplying the working fluid to the sub-cylinder and pressing it to displace the main piston in a stepped manner. Accordingly, the variation in the way of pressing the object by the main piston can be alleviated.

In a preferred embodiment of the pressing mechanism of the present invention, of the first, second and third driving mechanisms, at least the first driving mechanism is provided with a displacement enlarging portion that enlarges the displacement of the sub-piston for transmission to the main piston.

With such a mechanism, even a minute displacement of the first driving mechanism causes the working fluid to be pressed, and the main piston is displaced by the working fluid. Accordingly, it becomes possible to downsize the first driving mechanism and hence the entire pressing mechanism.

In the pressing mechanism of the present invention, the piping system through which the working fluid flows may be built in the pressing mechanism. This can prevent the working fluid from leaking outside the pressing mechanism.

The resin molding device of the present invention uses the pressing mechanism described above. The resin molding device includes: a reservoir in which molten resin is reserved; a plunger that is pressed by the main piston to press the molten resin; and a cavity into which the pressed molten resin is introduced. The molten resin introduced into the cavity is hardened for resin molding.

With such a structure, the main piston is pushed up as the working fluid supplied to the sub-cylinder is pressed. The main piston then presses the plunger, and the plunger in turn presses the molten resin, so that the molten resin is introduced into the cavity.

The pressing method, the pressing mechanism and the resin molding device of the present invention described above provide the following effects.

First, as the step of supplying the working fluid to the sub-cylinder and the step of pressing it to displace the main piston in a stepped manner are repeated, variation in the way of pressing the object by the main piston can be lessened. As the piezoelectric element having an accurate displacement is displaced, the variation in the way of pressing the object by the main piston can further be alleviated.

Further, by using the piezoelectric element, instead of a spring, as the driving means, downsizing of the pressing mechanism itself and hence the resin molding device itself is enabled.

Still further, the piping system is built in the pressing mechanism, so that the leakage of the working fluid outside the pressing mechanism can be prevented.

Accordingly, the present invention is practically very advantageous in that it provides the pressing method, the pressing mechanism and the resin molding device using the same that can reduce the variation in the way of pressing the object, prevent contamination due to the working fluid, and permit downsizing of the pressing mechanism and the resin molding device.

The above pressing method and mechanism can effectively be applied to a method and a mechanism for driving plungers of a resin molding device, whereby the plungers can be controlled independently from each other with high accuracy. Accordingly, respective plungers press the molten resin evenly, so that the molten resin can be introduced into corresponding cavities with a uniform pressure. This prevents generation of voids or surface sinks in the molded articles.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
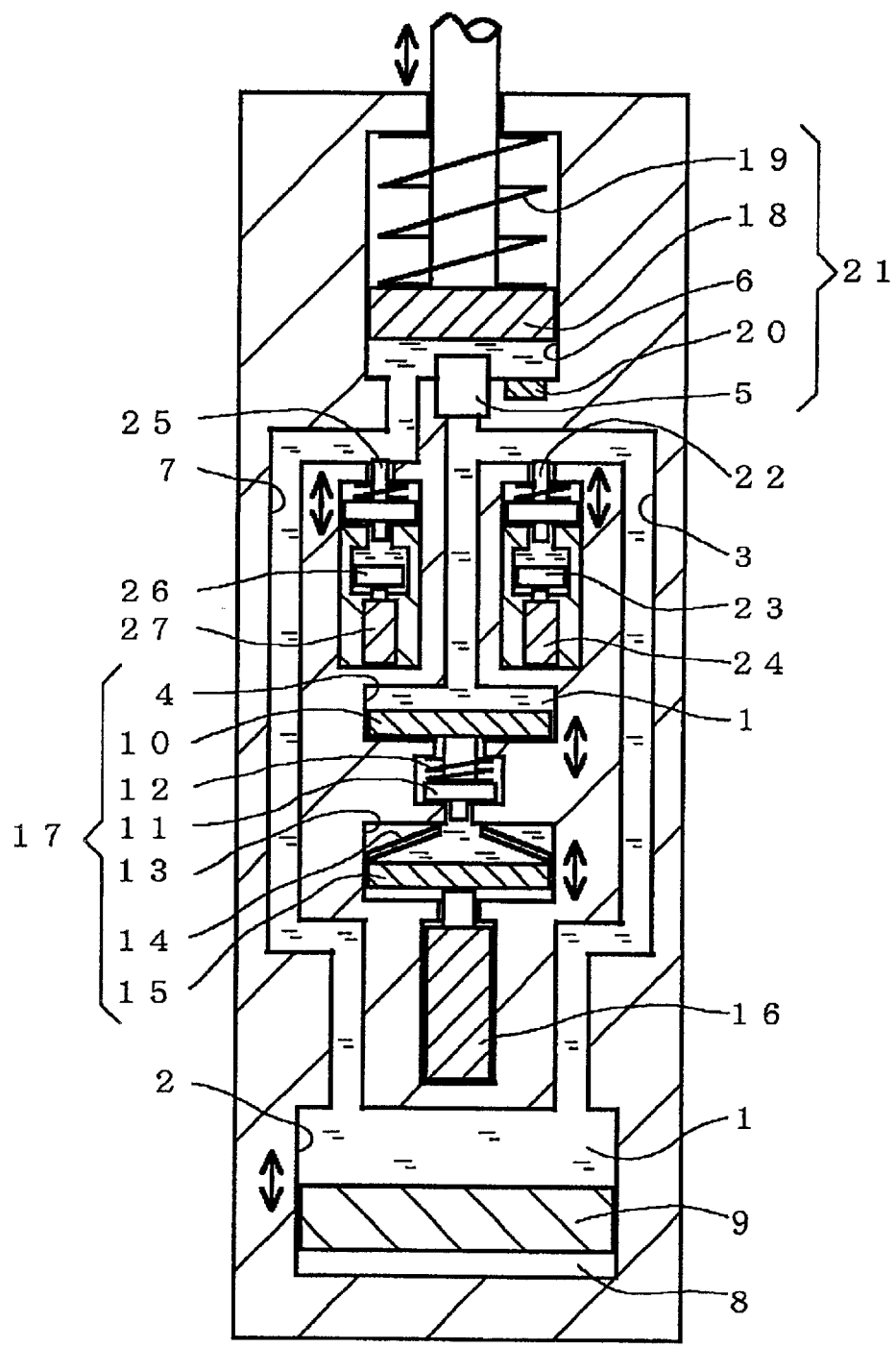
FIG. 1 is a cross sectional view showing a structure of the pressing mechanism according to a first embodiment of the present invention.

A pressing mechanism and a pressing method according to the first embodiment will be described with reference to FIGS. 1–4. FIG. 1 shows in cross section the structure of the pressing mechanism of the present embodiment.

Referring to FIG. 1, a supply line 3 links a hydraulic oil source 2 in which hydraulic oil 1 as the working fluid is reserved to a first sub-cylinder 4 and to a main cylinder 6 via a check valve 5. A discharge line 7 also links main cylinder 6 to hydraulic oil source 2. Gas 8 and a bottom plate 9 apply a prescribed pressure to hydraulic oil 1 reserved in hydraulic oil source 2. Accordingly, the hydraulic oil 1 is kept at a prescribed pressure through the entire piping system from hydraulic oil source 2, via supply line 3, first sub-cylinder 4, main cylinder 6, discharge line 7, back to hydraulic oil source 2.

Hydraulic oil 1 within first sub-cylinder 4 is pressed by a first sub-piston 10. First sub-piston 10 is pressed via a pressure plate 11 by hydraulic oil reserved in a second sub-cylinder 13. When the hydraulic oil stops pressing, pressure plate 11 is pushed down by a compression spring 12. The hydraulic oil reserved within second sub-cylinder 13 is pressed by a second sub-piston 15 via a leaf spring provided within second sub-cylinder 13. Second sub-piston 15 is attached to an end of a first piezoelectric element 16 that drives the sub-piston 15. First sub-cylinder 4, first sub-piston 10, pressure plate 11, compression spring 12, second sub-cylinder 13, leaf spring 14, and second sub-piston 15 in all constitute a displacement enlarging portion 17.

Check valve 5 allows the hydraulic oil 1 pressed in supply line 3 to flow into main cylinder 6, while it prevents reverse flow of hydraulic oil 1 from main cylinder 6 to supply line 3. A main piston 18 is provided within main cylinder 6, which ascends as hydraulic oil 1 flows via check valve 5 into main cylinder 6, and descends as hydraulic oil 1 flows out of main cylinder 6 to discharge line 7. When hydraulic oil 1 is discharged from main cylinder 6 to discharge line 7, a compression spring 19 ensures that main piston 18 is sufficiently pressed down. A pressure sensor 20 is provided on a wall surface of main cylinder 6, which detects a pressure of the working fluid in main cylinder 6, i.e., the hydraulic pressure of hydraulic oil 1. It generates an electrical signal corresponding to the hydraulic pressure, and outputs the signal to a control portion (not shown). Check valve 5, main cylinder 6, main piston 18, compression spring 19, and pressure sensor 20 in all constitute a pressing portion 21 that is a main portion of the pressing mechanism.

A supply control valve 22 is provided in supply line 3, which is driven via hydraulic oil by a valve piston 23 to open/close supply line 3. Valve piston 23 is attached to an end of a second piezoelectric element 24 that drives the piston 23.

Similarly, a discharge control valve 25 is provided in discharge line 7, which is driven via hydraulic oil by a valve piston 26, to open/close discharge line 7. Valve piston 26 is attached to an end of a third piezoelectric element 27 by which it is driven.

Supply control valve 22 and discharge control valve 25 are each provided with a leaf spring (not shown), as in second sub-cylinder 13, in a portion where the hydraulic oil is reserved.

Figure 2:
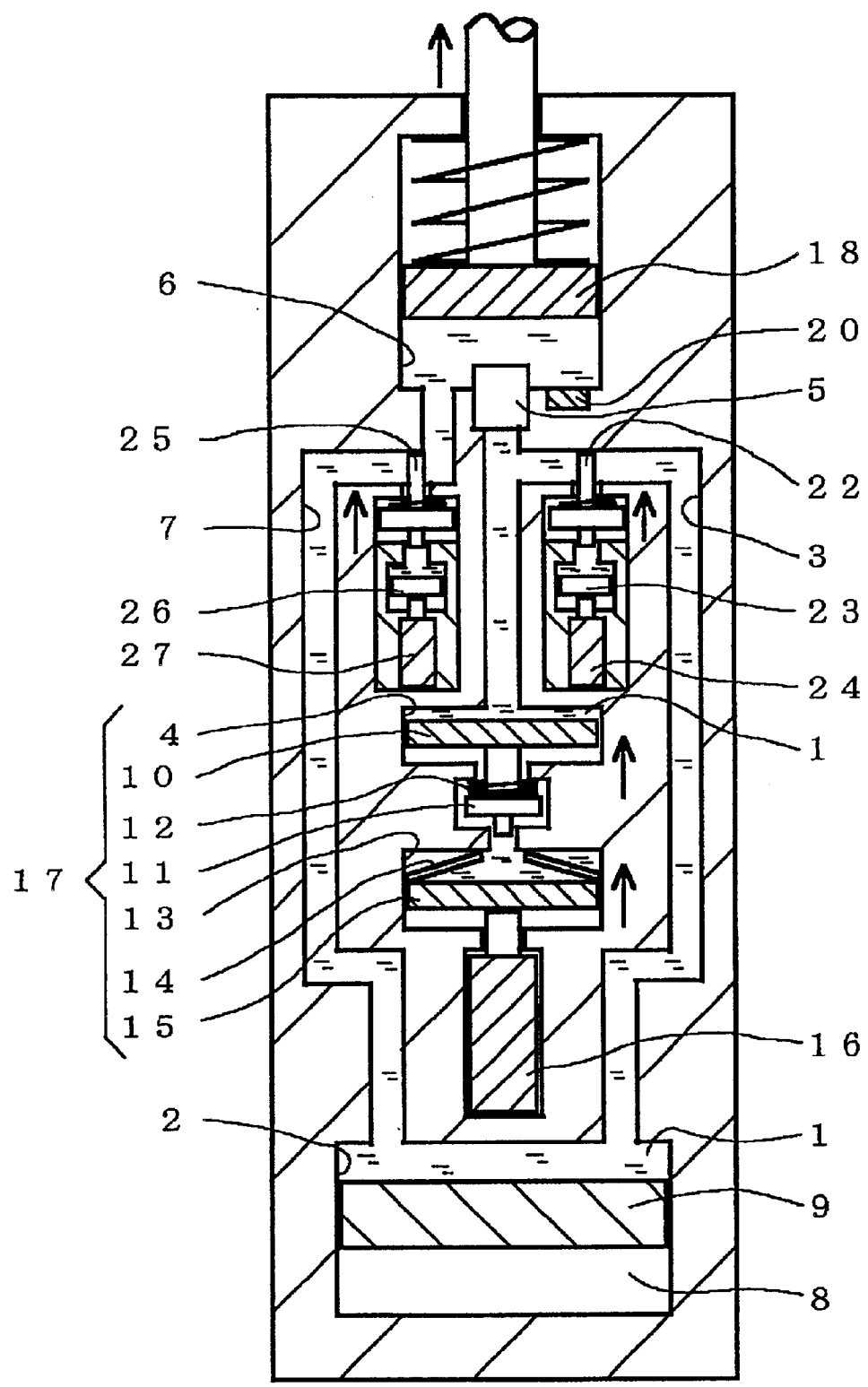
FIG. 2 is a cross sectional view of the pressing mechanism of FIG. 1, illustrating how the main piston is pushed up.

Hereinafter, the pressing method using the pressing mechanism shown in FIG. 1 will be described with reference to FIGS. 2–4. FIG. 2 shows in cross section how the pressing mechanism of FIG. 1 performs a pushing up operation of the main piston.

Initially, gas 8 and bottom plate 9 keep hydraulic oil 1 at a prescribed pressure through the piping system, i.e., from hydraulic oil source 2, via supply line 3, first sub-cylinder 4, main cylinder 6, discharge line 7, and back to hydraulic oil source 2.

In this state, a prescribed voltage is applied to each of second and third piezoelectric elements 24, 27 to make their ends slightly protrude, so that valve pistons 23, 26 attached to the ends of second and third piezoelectric elements 24, 27, respectively, are displaced upward in the drawing. Such displacements are enlarged by means of the hydraulic oil, and thus, supply control valve 22 closes supply line 3, and discharge control valve 25 closes discharge line 7.

Next, a prescribed voltage is applied to first piezoelectric element 16 to cause its end to protrude slightly, so that second sub-piston 15 attached to the end of first piezoelectric element 16 is displaced upward in the drawing. Thus, the hydraulic oil within second sub-cylinder 13 presses pressure plate 11, which in turn presses first sub-piston 10, which in turn presses hydraulic oil 1 within first sub-cylinder 4. The pressed hydraulic oil 1 flows via check valve 5 into main cylinder 6, so that main piston 18 is pushed up.

Here, second sub-cylinder 13 is configured to have a cross section sufficiently larger than that of a portion of pressure plate 11 receiving a pressure of the hydraulic oil from second sub-cylinder 13. This enables the minute displacement of the end of first piezoelectric element 16 to be enlarged and transmitted to first sub-piston 10, and the enlarged displacement to be further transmitted via hydraulic oil 1 to main piston 18. In other words, displacement enlarging portion 17 enlarges minute protrusion of the end of first piezoelectric element 16 for transmission to main piston 18 to push it up.

Figure 3:
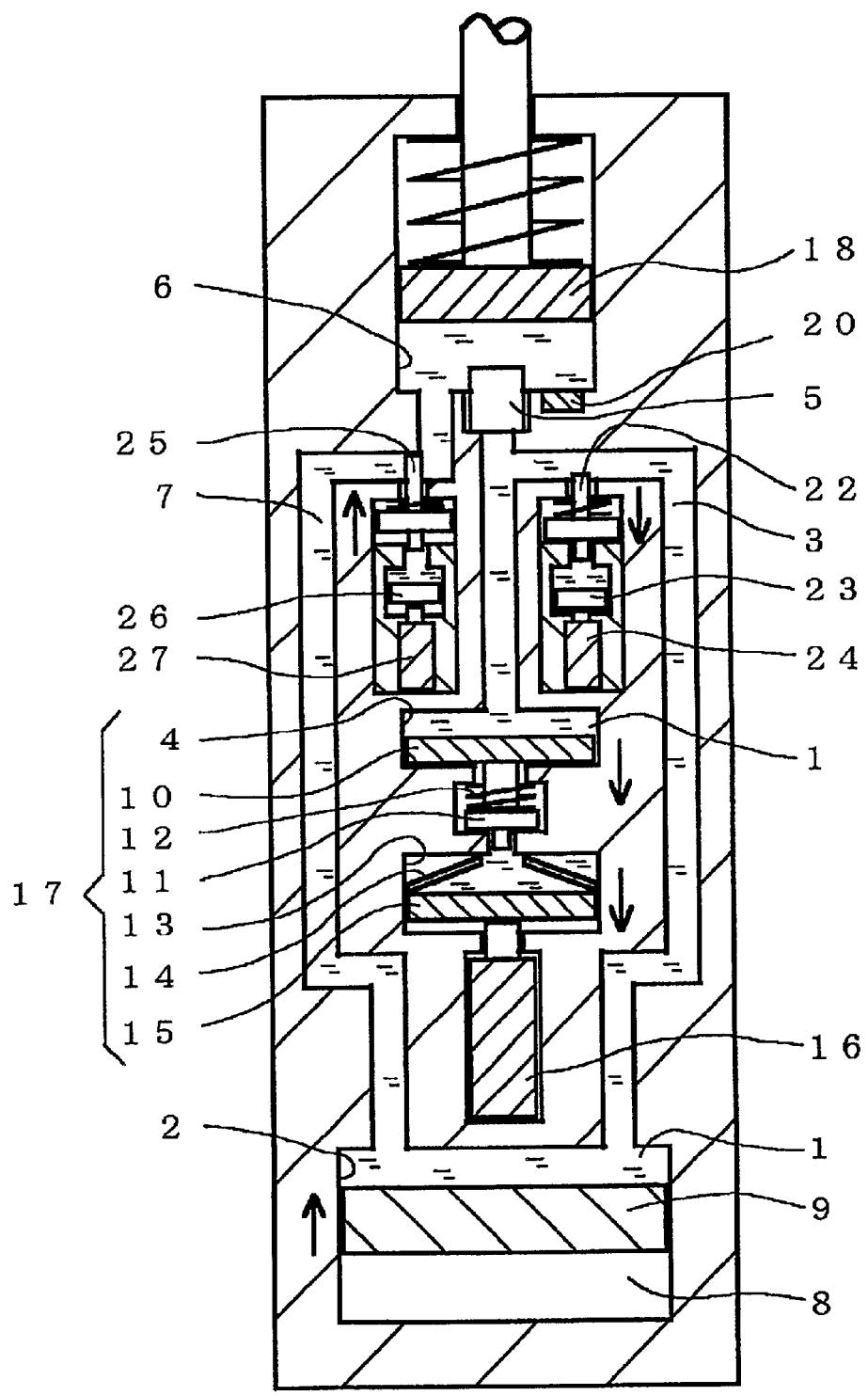
FIG. 3 is a cross sectional view of the pressing mechanism of FIG. 1, illustrating how a preparation is made for the main piston having been pushed up to be further pushed up.

Next, as shown in FIG. 3, a preparation is made to further push up main piston 18. FIG. 3 shows in cross section how the pressing mechanism of FIG. 1, whose main piston has been pushed up, prepares for a succeeding pushing up operation of the main piston.

Here, hydraulic oil 1 is introduced into first sub-cylinder 4, with main piston 18 being maintained in its position. More specifically, the voltage having been applied to second piezoelectric element 24 is shut down to let its end return to the initial position. This lowers valve piston 23, which in turn lowers supply control valve 22 by means of the hydraulic oil, so that supply control valve 22 opens supply line 3. Further, the voltage having been applied to first piezoelectric element 16 is shut down to make its end return to the initial position. This lowers second sub-piston 15, which in turn lowers first sub-piston 10 by means of the hydraulic oil within second sub-cylinder 13 and of pressure plate 11. Through a series of these operations, displacement enlarging portion 17 works as a pump to let hydraulic oil 1 flow from hydraulic oil source 2 to first sub-cylinder 4. During this process, check valve 5 is closed to prevent reverse flow of hydraulic oil 1 within main cylinder 6 to supply line 3, and discharge control valve 25 is closed to prevent discharge of the oil to discharge line 7. Accordingly, main piston 18 is maintained in place.

Next, the operation described in conjunction with FIG. 2 is repeated. Specifically, a prescribed voltage is applied to second piezoelectric element 24 to let its end slightly protrude, so that valve piston 23 attached to the end is displaced upward. The displacement is enlarged by means of the hydraulic oil, and thus, supply control valve 22 closes supply line 3.

Further, a prescribed voltage is applied to first piezoelectric element 16, so that the end of first piezoelectric element 16 is slightly protruded or displaced upward. Displacement enlarging portion 17 enlarges this minute displacement, and transmits the enlarged displacement to main piston 18 to further push up main piston 18.

Repeating the operations of pushing up main piston 18 and of introducing hydraulic oil 1 into first sub-cylinder 4 causes main piston 18 to ascend in a stepped manner. Pressure sensor 20 detects the hydraulic pressure within main cylinder 6, and outputs an electrical signal corresponding to the detected hydraulic pressure to a control portion (not shown).

Main piston 18 is configured to ascend up to a preset position. When the hydraulic pressure within main cylinder 6 attains a prescribed pressure level corresponding to the position, i.e., when the control portion receives an electrical signal of a prescribed value, the control portion stops applying the voltage to first piezoelectric element 16. Thus, the end of first piezoelectric element 16 stops displacement and returns to its initial position, and second sub-piston 15 also stops displacement. Accordingly, main piston 18 is stopped at the preset position.

Figure 4:
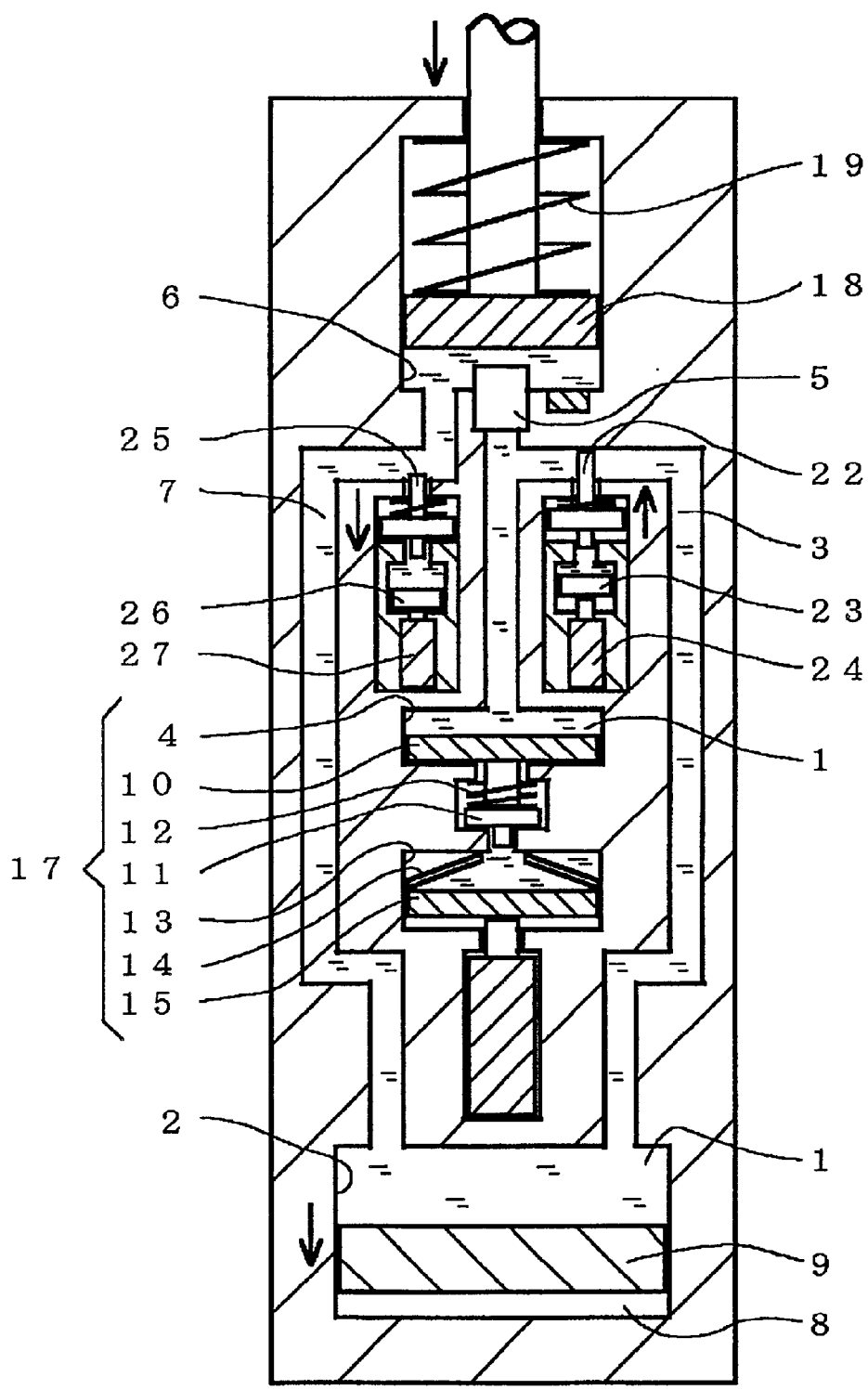
FIG. 4 is a cross sectional view of the pressing mechanism of FIG. 1, illustrating how the main piston is lowered to return to its initial position.

When main piston 18 is no longer necessary to stay at the preset position, main piston 18 is lowered to return to its initial position, as shown in FIG. 4. FIG. 4 shows in cross section how the pressing mechanism of FIG. 1 causes the main piston to descend to its initial position.

Here, in the state where supply line 3 is closed by supply control valve 22, the voltage having been applied to third piezoelectric element 27 is shut down to cause its end to return to the initial position. This lowers valve piston 26, which in turn lowers discharge control valve 25 by means of the hydraulic oil, so that discharge control valve 25 opens the discharge line 7. Main piston 18 descends as compression spring 19 pushes it downward. With check valve 5 being closed, reverse flow of hydraulic oil 1 within main cylinder 6 to supply line 3 is prevented. Hydraulic oil 1 flows back to hydraulic oil source 2, so that bottom plate 9 is pressed down. With these operations, main piston 18 returns to its initial position.

As explained above, according to the present embodiment, the piping for hydraulic oil 1 is placed within the body of the pressing mechanism, which prevents contamination of the surrounding area due to leakage of hydraulic oil 1. Further, first piezoelectric element 16 is used, whose minute displacement is enlarged by displacement enlarging portion 17 for transmission to main piston 18. Thus, unlike the case where the ascent of the base is transmitted to the main piston by means of the spring, a spring with a large diameter is unnecessary, allowing downsizing of the pressing mechanism. To drive a plurality of main pistons 18, a plurality of pressing mechanisms can be provided corresponding thereto, so that each piston 18 can be controlled individually using relevant first piezoelectric element 16. Accordingly, it becomes possible to push up respective main pistons 18 evenly, with high accuracy.

Figure 5:
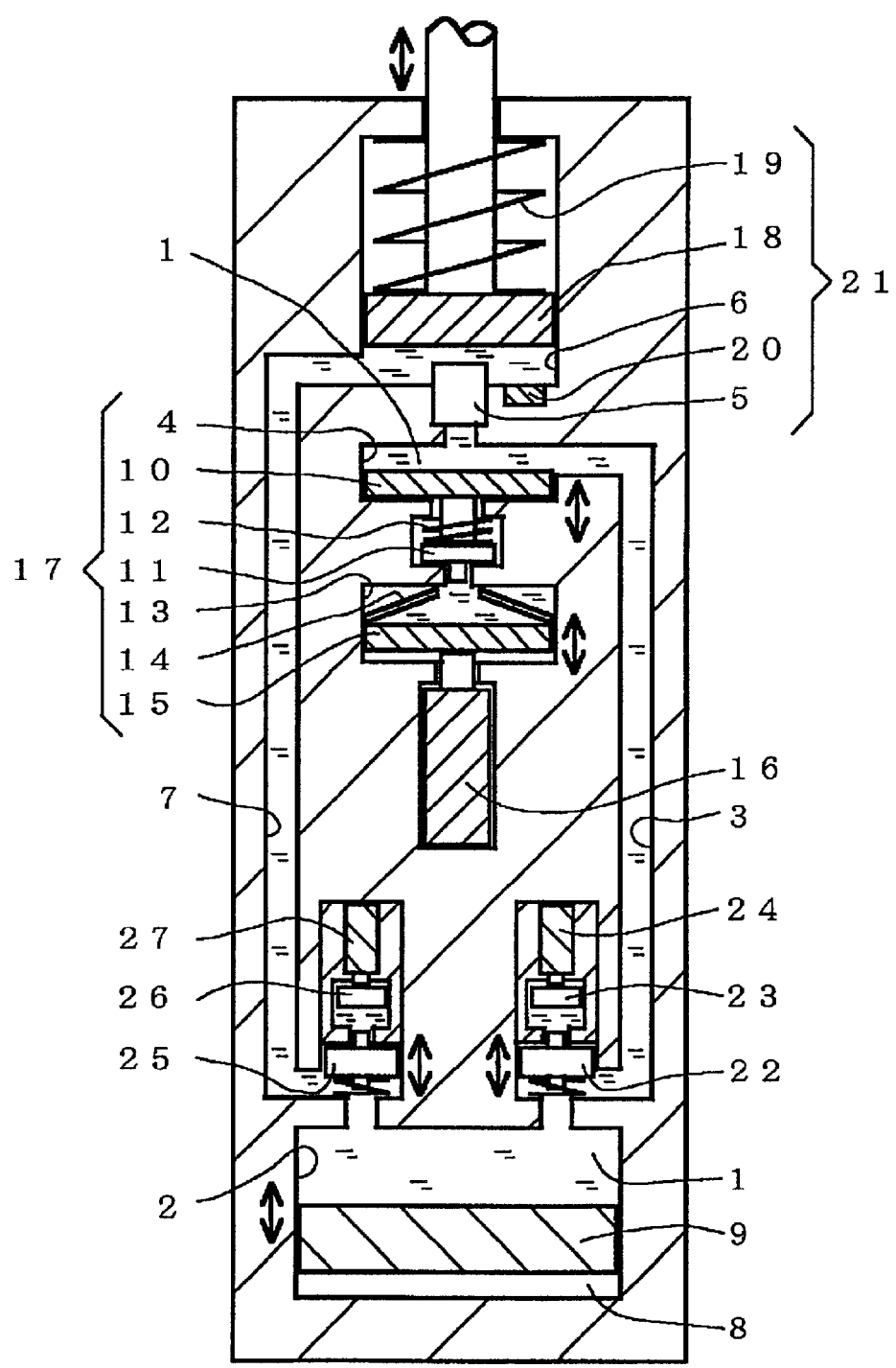
FIG. 5 is a cross sectional view showing a structure of a variation of the pressing mechanism shown in FIG. 1.

A variation of the pressing mechanism of the present embodiment will now be described with reference to FIG. 5 showing the structure thereof.

In the pressing mechanism shown in FIG. 1, supply control valve 22 and discharge control valve 25 have both been located close to main cylinder 6 in supply line 3 and discharge line 7, respectively. Instead, in FIG. 5, they both are located close to hydraulic oil source 2. Alternatively, supply control valve 22 and discharge control valve 25 may be located in any other places in supply line 3 and discharge line 7, respectively.

As explained above, according to the present embodiment, a high degree of freedom is ensured for placement of supply control valve 22 and discharge control valve 25. Accordingly, it becomes possible to provide a pressing mechanism of a desired shape, e.g., of an elongated shape, or of a shape low in height and large in base area.

In the present embodiment, two stages of sub-cylinders, first and second sub-cylinders 4, 13, have been provided for first piezoelectric element 16. Not limited thereto, just one stage of sub-cylinder may be provided, as long as one displacement of first piezoelectric element 16 can realize a displacement required for main piston 18. In this case, a sub-cylinder and a sub-piston of large area may be utilized to increase the displacement of main piston 18 corresponding to one displacement of first piezoelectric element 16.

To further increase the displacement of main piston 18 corresponding to one displacement of first piezoelectric element 16, first piezoelectric element 16 may also be provided with more than two stages of sub-cylinders.

Second Embodiment

Figure 6:
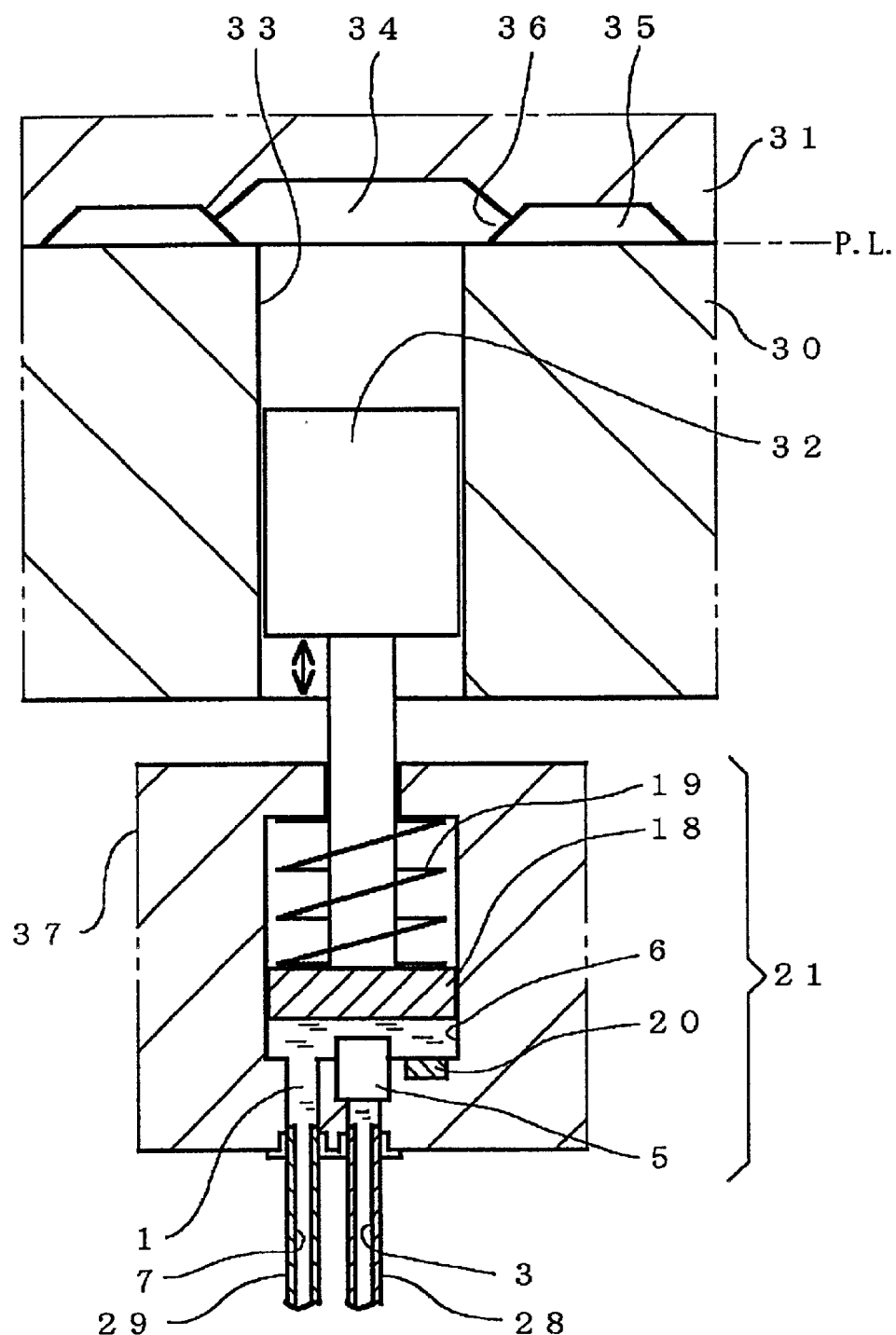
FIG. 6 is a cross sectional view showing portions of the pressing mechanism and a resin molding device using the same according to a second embodiment of the present invention.

A pressing mechanism and a resin molding device using the same according to the second embodiment of the present invention will now be described with reference to FIG. 6 showing respective portions thereof.

Referring to FIG. 6, the pressing portion 21 is provided separately from the portion where the hydraulic oil source (not shown) of the pressing mechanism is provided. A supplying pipe 28 as supply line 3 from the hydraulic oil source and a discharging pipe 29 as discharge line 7 to the hydraulic oil source are connected to pressing portion 21. Preferably, supplying pipe 28 and discharging pipe 29 are each formed of a flexible pipe.

As shown in FIG. 6, the resin molding device of the present embodiment is provided with a lower mold 30 and an upper mold 31 facing each other. Lower mold 30 has a space of a cylindrical shape, in which a plunger 32 secured at an end of the axis integrated with main piston 18 is inserted. Of the space of the cylindrical shape, a portion above the plunger 32 forms a pot 33, in which a resin tablet (not shown) of a columnar shape made of thermosetting resin, for example, is placed.

Upper mold 31 includes: a cull portion 34 for distributing the resin tablet molten by heat, or molten resin; a cavity 35 as a space into which the molten resin is introduced for hardening; and a gate portion 36 as an opening through which the molten resin is provided via cull portion 34 to cavity 35.

In the present embodiment, pressing portion 21 is provided in a block 37 constituting a portion of the body of the resin molding device.

The resin molding device shown in FIG. 6 is of the type in which a substrate with an electronic component in a chip form mounted therein is rested on a die-matching plane (indicated as P. L. in FIG. 6), and molten resin is introduced into cavity 35 and hardened to resin-seal the substrate. Referring to FIG. 6, hydraulic oil 1 being provided via supplying pipe 28 to main cylinder 6 causes main piston 18 to ascend, and thus, plunger 32 presses molten resin (not shown), which is introduced via cull portion 34, gate portion 36 into cavity 35. After the molten resin is hardened to cured resin, lower mold 30 and upper mold 31 are separated, and the substrate integrated with the cured resin is taken out.

As explained above, according to the pressing mechanism of the present embodiment, as in the first embodiment, downsizing of the pressing mechanism is enabled, and if a plurality of main pistons 18 are provided, they can be pushed up evenly, with high accuracy. In addition, since supplying pipe 28 and discharging pipe 29 are used for supply and discharge of hydraulic oil 1 between the hydraulic oil source and pressing portion 21, it becomes possible to place the hydraulic oil source and pressing portion 21 separately from each other. This increases the degree of freedom of design when designing a device using the pressing mechanism.

Further, according to the resin molding device of the present embodiment, the degree of freedom in designing the resin molding device is increased, and downsizing of the resin molding device is allowed. In the case where there are a plurality of plungers 32, they can be controlled independently from each other with high accuracy. Accordingly, respective plungers 32 press the molten resin evenly, so that the molten resin can be introduced into corresponding cavities 35 with a uniform pressure. This prevents generation of voids or surface sinks in the molded articles.

In the present embodiment, the pressing mechanism having the hydraulic oil source and pressing portion 21 provided separately from each other has been used. However, the pressing mechanism shown in FIG. 1 may be used alternatively, in which case contamination due to the hydraulic oil can further be prevented.

In the respective embodiments described above, first, second and third piezoelectric elements 16, 24 and 27 have been used to drive first sub-piston 10, supply control valve 22 and discharge control valve 25, respectively. Alternatively, electrical actuators like solenoids or air cylinders may be employed.

Further, as the working fluid, instead of hydraulic oil 1, any fluid working in a similar manner may be employed.

Although bottom plate 9 has been held by gas 8 in FIG. 1, a compression spring may be employed instead of gas 8, or a combination of the compression spring and the gas may be employed. Further, compression spring 19 used in pressing portion 21 may be replaced with gas, or a combination of compression spring 19 and the gas may be employed.

The resin molding device using the pressing mechanism has been described above. However, the pressing mechanism of the present invention is of course applicable to other devices.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for pressing an object with a main piston placed in a main cylinder by means of applying a prescribed pressure to said main piston with working fluid wherein:

said working fluid is compressed to said prescribed pressure by supplying said working fluid to said main cylinder with driving power of a piezoelectric element, said prescribed pressure is applied through a piping system that includes said main cylinder, a supply line and a discharge line of said working fluid with respect to said main cylinder, a check valve preventing reverse flow of said working fluid from said main cylinder to said supply line, and a sub-cylinder provided within said supply line, said method comprises:

a first step of displacing a sub-piston provided within said sub-cylinder from an initial position to press said working fluid such that said working fluid is introduced via said main piston provided within said main cylinder; and a second step of causing said sub-piston to return to said initial position such that said working fluid is supplied to said sub-cylinder, said first step and said second step are repeated successively until a pressure of said working fluid in said main cylinder reaches said prescribed pressure, said first step is performed in a state in which a discharge control valve disposed in said discharge line and a supply control valve disposed in said supply line are closed, said second step is performed in a state in which said discharge control valve and said check valve are closed and said supply control valve is open, said supply control valve, said discharge control valve and said sub-piston each respectively have a respective said piezoelectric element attached thereto, and said piezoelectric elements serve to open and close said supply control valve and said discharge control valve, and to displace said sub-piston from the initial position, respectively.

2. The pressing method according to claim 1, wherein a prescribed voltage is applied to said piezoelectric element attached to said sub-piston repeatedly until the pressure of said working fluid reaches to said prescribed pressure.

3. The pressing method according to claim 1, wherein a detector provided in said main cylinder detects the pressure of said working fluid, and when said detector detects said prescribed pressure, the displacement of said sub-piston is terminated.

4. A method of pressing an object using an apparatus including a pressing piston device, a fluid supply line connected to a fluid inlet of said pressing piston device and adapted to supply a working fluid, a piezoelectrically actuated supply control valve interposed in said fluid supply line, a piezoelectrically actuated pump connected to or interposed in said fluid supply line between said supply control valve and said fluid inlet of said pressing piston device, a one-way check valve interposed in said fluid supply line between said pump and said fluid inlet of said pressing piston device, a fluid discharge line connected to a fluid outlet of said pressing piston device and adapted to discharge the working fluid from said pressing piston device, and a piezoelectrically actuated discharge control valve interposed in said fluid discharge line, wherein said method comprises the steps:

a) closing said check valve, electrically controlling said piezoelectrically actuated discharge control valve so as to be in a closed state thereof, and electrically controlling maid piezoelectrically actuated supply control valve so as to be in an open state thereof;

b) with said check valve closed, said discharge control valve in said closed state thereof arid said supply control valve in said open stats thereof, electrically controlling said piezoelectrically actuated pump to draw the working fluid through said supply control valve into said pump;

c) after said step b), electrically controlling said piezoelectrically actuated discharge control valve so as to be in said closed state thereof, and electrically controlling said piezoelectrically actuated supply control valve so as to be in a closed state thereof;

d) with said discharge control valve in said closed state thereof and said supply control valve in said closed state thereof, electrically controlling said piezoelectrically actuated pump so as to pressurize the working fluid in said pump, thereby opening said check valve, and pumping an amount of the working fluid from said pump through said check valve into said pressing piston device; and e) repeating said steps a), b), c) and d) until a pressure of the working fluid in said pressing piston device reaches a prescribed pressure, thereby advancing a pressing piston of said pressing piston device so as to press the object.

5. The method according to claim 4, wherein said controlling of said pump in said step d) comprises applying a first electrical voltage to a first piezoelectric actuator element of said pump, said controlling of said pump in said step b) comprises disconnecting said first electrical voltage from said first piezoelectric actuator element, said controlling of said supply control valve in said step c) comprises applying a second electrical voltage to a second piezoelectric actuator element of said supply control valve, said controlling of said supply control valve in said step a) comprises disconnecting said second electrical voltage from said second piezoelectric actuator element, and said controlling of said discharge control valve in said step a) and said step c) comprises applying a third electrical voltage to a third piezoelectric actuator element of said discharge control valve.

6. The method according to claim 4, further comprising, after completing said pressing of said object in said step e), a further step of electrically controlling said piezoelectrically actuated discharge control valve so as to be in an open state thereof, and discharging a quantity of the working fluid out of said pressing piston device through said discharge control valve to retract said pressing piston.

7. The method according to claim 4, further comprising sensing the pressure of the working fluid in said pressing piston device with a pressure sensor, and terminating said step d) when maid pressure sensed with said pressure sensor reaches said prescribed pressure.

* * * * *

UNITED STATES PATENT AND TRADEMARK OFFICE
CERTIFICATE OF CORRECTION

PATENT NO.    : 6,851,355 B2
DATED         : February 8, 2005
INVENTOR(S)   : Harada et al.

It is certified that error appears in the above-identified patent and that said Letters Patent is hereby corrected as shown below:

Column 10,
Line 40, before "piezoelectrically", replace "maid" by -- said --;
Line 43, after "thereof", replace "arid" by -- said --;
Line 44, after "open", replace "stats" by -- state --.

Column 12,
Line 10, after "when", replace "maid" by -- said --.

Signed and Sealed this

Twenty-fourth Day of May, 2005

JON W. DUDAS
*Director of the United States Patent and Trademark Office*